UNITED STATES PATENT OFFICE.

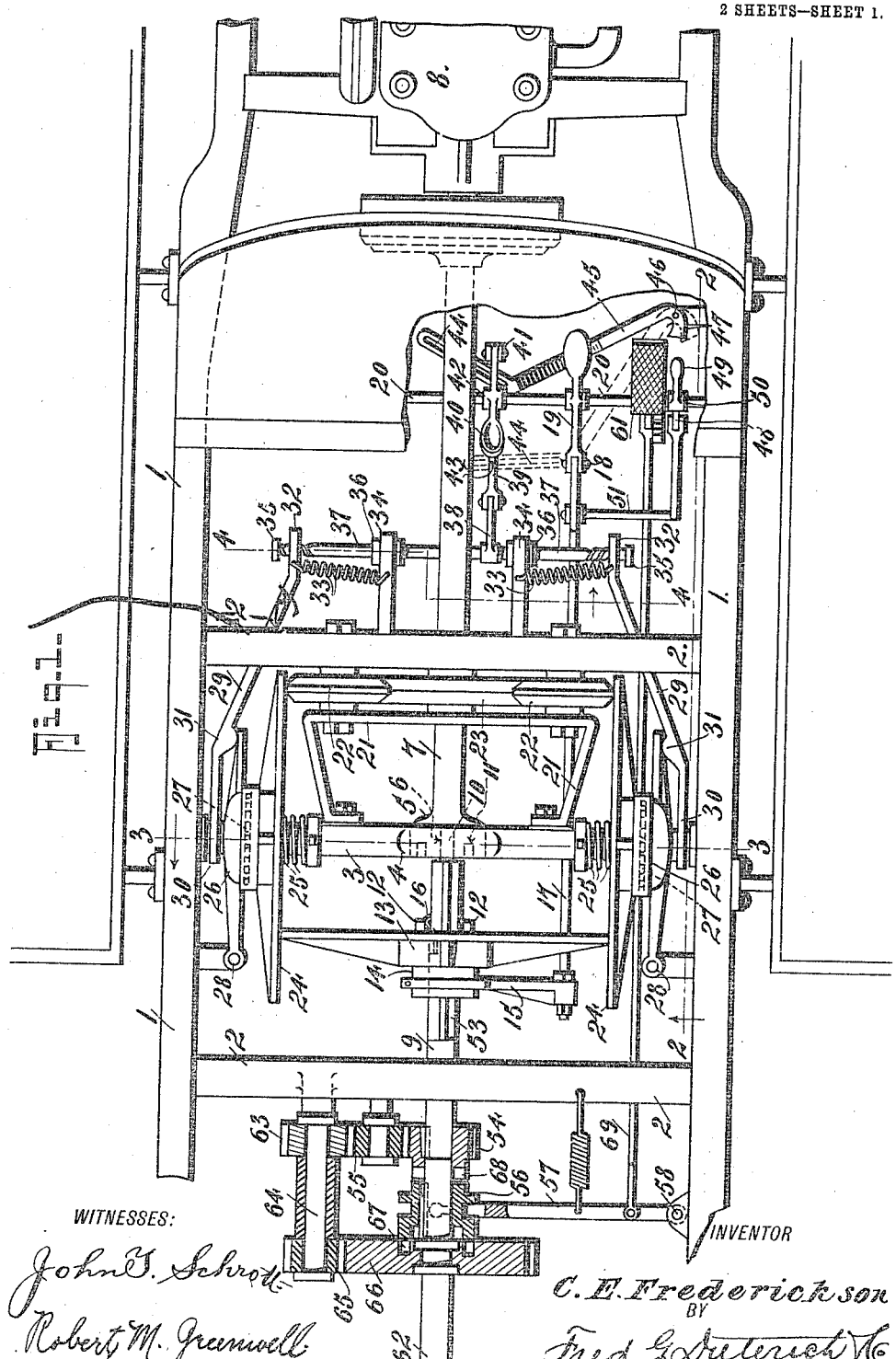

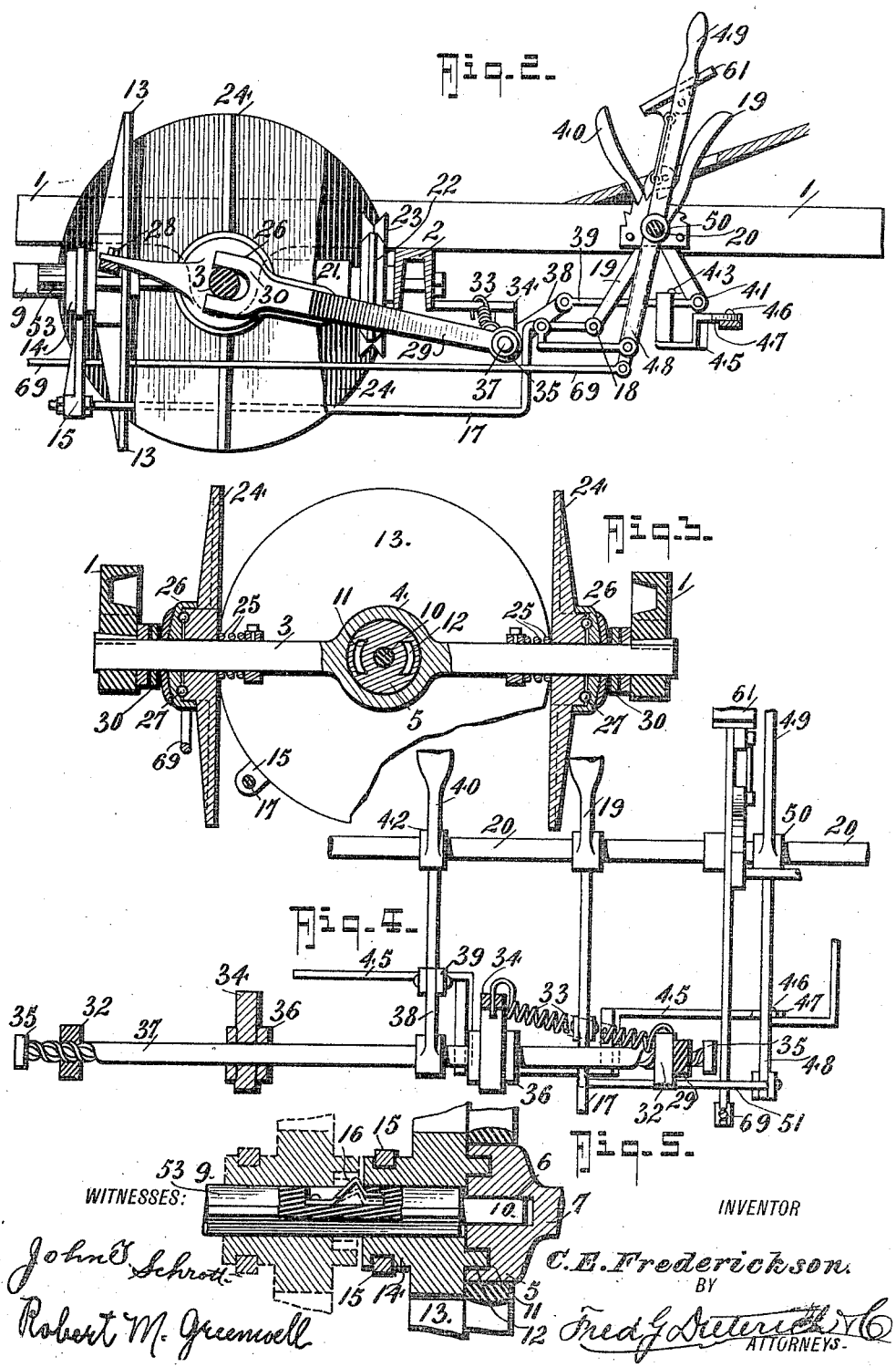

CLAYTON E. FREDERICKSON, OF SAN FRANCISCO, CALIFORNIA, ASSIGNOR OF ONE-HALF TO WILLIAM H. STENGER, OF BERKELEY, CALIFORNIA.

TRANSMISSION-GEAR MECHANISM.

1,038,553.   Specification of Letters Patent.   Patented Sept. 17, 1912.

Application filed November 7, 1911. Serial No. 658,960.

*To all whom it may concern:*

Be it known that I, CLAYTON E. FREDERICKSON, residing at San Francisco, in the county of San Francisco and State of California, have invented certain new and useful Improvements in Transmission-Gear Mechanism, of which the following is a specification.

My invention relates to certain new and useful improvements in power transmitting mechanisms which are more particularly adapted for use on motor vehicles and the like, and the invention primarily has for its object to provide an improved transmission mechanism of the friction drive or friction disk type in which the parts are so coöperatively arranged and designed as to produce as high degree of efficiency and safety in operation as possible.

In its generic nature, the invention embodies a driving shaft directly coupled with the power plant, which power plant may be either a two-cycle reversible gas engine, a four-cycle non-reversible gas engine or other prime mover. The driving shaft has a bearing for the driven shaft, the two shafts being in alinement and the driven shaft carries a shiftable friction disk which is driven through friction gears from the driving shaft, means being provided for releasing the friction gear connection between the driving and driven shafts during the time of "gear shifting" and when it is desired to obtain a direct drive between the two shafts; means are also provided for locking the release mechanism during the time the direct drive connection is in operation.

My invention also embodies those novel details of construction, combination and arrangement of parts, all of which will be first fully described and then be specifically pointed out in the appended claims, reference being had to the accompanying drawings, in which:

Figure 1, is a top plan view of a part of the motor vehicle chassis embodying the invention. Fig. 2, is a section on the line 2—2 of Fig. 1. Fig. 3, is a section on the line 3—3 of Fig. 1. Fig. 4, is a section on the line 4—4 on Fig. 1. Fig. 5, is an enlarged detail section of a part of the invention.

Referring now to the accompanying drawings, in which like letters and numerals of reference indicate like parts in all of the figures, 1 designates the longitudinal beams of the chassis and 2 the cross brace beams.

3 designates a shaft-like bearing member that is rigidly mounted between the longitudinal beams 1 and which has an enlarged central bearing portion 4 to receive the bearing end 5 of the driving shaft 7. The driving shaft 7 is connected in the usual way with the prime mover or power plant 8, and it also has a bearing socket 6 for the projecting bearing end 10 of the driven shaft 9. The bearing 5 is provided with clutch recesses 11 to receive clutch lugs 12 on the hub of the shiftable friction disk 13.

The friction disk 13 has a projecting portion 14 grooved to receive the bifurcated end of the shifting arm 15 to which the shifting rod 17 is rigidly connected. The rod 17 is pivoted at 18 to the change speed pedal 19 that is pivotally mounted in any suitable way in a position to be conveniently accessible by the operator, a shaft 20 being shown in the drawing on which the pedal 19 is rockably mounted.

21 is a frame member secured to the member 3 and between which and the adjacent cross brace 2 of the chassis, the friction gears 22 are mounted, the gears 22 being turned by engaging the friction gear 23 that is secured on the shaft 7 to turn with the same.

The ends of the member 3 are rounded to form shaft portions and receive the friction gears 24 which are spring pressed outwardly to disengage the gears 22 by springs 25 and which are held in engagement with the gears 22 by mechanism best shown in Fig. 1 of the drawings. This mechanism comprises a thrust bearing member 26 that engages the member 24 through the interposition of anti-friction bearings 27 of any approved type, the thrust bearing member 26 having a lever that is pivoted at 28 and has its free end engaged by a lug 31, on an operating lever 29 that is mounted at one end 30 on the shaft portion of the frame 3 and has its other end 32 threaded onto the screw rod 37, as shown. The rod 37 is mounted in bearings 34 projecting from the cross brace 2, adjacent to the rod, and it is prevented from having endwise movement by collars 36. The levers 29 are pulled toward one another by springs 33 and the rod 37 may be provided with stops 35 at its ends to prevent complete disengagement between the rod 37 and the levers 29. The screw rod 37 is operated by a release pedal 40 which is pivoted at 42 and connected by a connecting rod 39 with a lever 38 on the rod 37, the connecting rod 39 being pivoted at 41 to the pedal 40. The rod 39 has a pin 43 that works in a slot 44 in the locking lever 45. The lever 45 is pivoted at 46 and has a locking heel 47 to coöperate with the high speed lever 49, as will be hereinafter more clearly explained. The high speed lever 49 is pivoted at 50 and has its end 48 secured by a connecting rod 51 to the rod 17 that operates the shifting disk 13. The shaft 9 is provided with a squared portion 53 to cause the disk 13 to turn with it, and it is also provided with a retaining spring 16 for a purpose hereinafter made clear.

When a two-cycle reversible engine is employed the foregoing parts are all that need to be used, but when a non-reversible engine is employed it is necessary to provide a reversing gearing on the shaft 9. Any type of reversing gearing may be employed. For purpose of illustration, I have shown the shaft 9 as made in two sections 9 and 62, the end of the shaft 9 carrying a gear 54 which is secured to the shaft 9 to turn therewith. The gear 54 has a clutch face 68 that may be socketed to receive the end of the shaft section 62, and the gear 54 meshes with an idler gear 55 that in turn meshes with a countershaft gear 63, on a countershaft 64 that has a pinion 65 to mesh with the loose gear 66 on the shaft 62. The gear 66 is held from movement along the shaft in any suitable way and it has a clutch face 67 to be engaged by the shiftable clutch member 56 which is keyed to the shaft section 62 and may be shifted into engagement with either of the clutch faces 68 and 67, through the medium of the shifting lever 57 which is pivoted at 58 to a suitable support and is held to normally hold the clutch member 56 in engagement with the clutch face 68. The lever 57 may be operated by a foot pedal 61 on the rod or shaft 20 through the medium of connecting rod 69.

While the reversing gearing may or may not be used with a reversible engine it is unnecessary to use it with a reversible engine and I prefer, when a reversible engine is used, to eliminate the reversing gearing, but where a non-reversible engine is employed some type of reversing gearing must be used in order to obtain the practical results required.

In operation, let it be assumed that the engine is running to drive the shaft 7, and the parts are in the position shown in Fig. 1. Motion is imparted to the shaft 9 in the same direction as the shaft 7, through the medium of the friction gears 23—22—24—13. In order to change the speed, the operator presses forward on the release pedal 40 to turn the screw shaft 37 and thereby separate the levers 29 and permit the springs 25 to push the friction disk gears 24 away from one another and out of contact with the gears 22 and 13. He next presses the pedal 19 to move the disk 13 rearwardly toward the periphery of the disks 24 to increase the speed to the maximum indirect drive. He then disengages the pedal 40, whereupon the springs 33 restore the pedal 40 to its initial position, at the same time bringing the levers 29 closer together to press on the levers of the bearings 26 and thereby again bring the disks or gears 24 into engagement with the gears 22—13. Should it be desired to have the direct drive connection or the highest speed, the operator presses the release pedal 40 forwardly to its maximum degree. This releases the disk gears 24 from engagement with the gears 22 and the shiftable gear disk 13 and at the same time moves the heel 47 to the position shown in Fig. 1 and out of the path of movement of the lower end 48 of the hand lever 49. He then grasps the lever 49 and pulls it toward him to its maximum distance thereby causing the disk 13 to be pulled up closely to the member 3 and bring its projecting lugs 12 into the sockets 11 (see Fig. 5), which connects the shafts 7 and 9 directly so that they will rotate together. At this time also the projecting end 48, of the hand lever 49, will rest in the bend of the locking lever 45 so that the heel 47 will bear against the side of the projecting end 48 and prevent the release pedal 40 from moving upwardly to its initial position when disengaged by the foot of the operator and thus the gear disks 24 will be locked out of engagement with the gears 22 and 13 during the time the shafts 7 and 9 are in direct connection. To move out of the direct drive position, the operator need only press the foot pedal 19 or move the lever 49 forwardly whereupon the lower end 48 of the lever 49 will leave the heel 47 and release the pedal 40 to permit the springs 33 to act and again bring the gears 22, 24 and 13 into engagement. When it is desired to reverse the movement of the car the operator presses on the pedal 61 and thus shifts the clutch member 56 out of engagement with the clutch face 68 and into engagement with the clutch face 67, thus locking the gear 66 to the shaft 62 and reversing the direction of movement thereof.

Attention is called to the fact that the heel 47 is an abutment which normally projects into the path of the lever 48 so that the lever 49 cannot be pulled back to throw the shafts 7 and 9 into direct connection until the release pedal 40 has been thrown to its maximum position forward to bring the locking lever 45 into the dotted line position shown in Fig. 1, thus preventing accidental direct connection being made between the shafts 7 and 9.

From the foregoing description, taken in connection with the accompanying drawings, it is thought the complete construction, operation and advantages of my invention will be readily apparent to those skilled in the art, and I desire it understood that changes in the details of construction, combination and arrangement of parts may be made without departing from the invention or the scope of the appended claims.

What I claim is:

1. In a power transmitting mechanism, a driving shaft and a driven shaft, a train of friction gears connecting said shafts and including a shiftable gear disk mounted on the driven shaft, a disk member meshing with said shiftable disk, means continuously tending to move said last named disk member out of engagement with said shiftable disk, other means continuously tending to oppose the action of said first mentioned disk moving means, and means for positively overcoming the action of said last named continuously tending means to permit first mentioned continuously tending means to act.

2. In a power transmitting mechanism, a driving shaft and a driven shaft, friction gears connecting said shafts and including a pair of laterally movable gear disks mounted independently of said shafts, a fixed driving disk on the driving shaft, means for imparting motion from said fixed driving disk to said independently mounted disks, a shiftable disk on said driven shaft to engage said independently mounted disks, pedal actuated means for operatively disconnecting and connecting said independently mounted disks from said shiftable driven shaft disk, and another pedal actuated means for shifting said shiftable driven shaft disk.

3. In a power transmission mechanism, a driven shaft and a driving shaft, a transverse frame member, a pair of friction disks mounted on said frame member and movable toward and from the axial line of said shafts, a shiftable disk on said driven shaft, means for shifting said driven shaft disk along said driven shaft, means continuously tending to hold said transverse frame member disks in engagement with said driven shaft disk, means for transmitting the power of the driving shaft to said transverse frame member disks, means continuously tending to release said transverse frame member disks from engagement with said driven shaft disk, and pedal actuated means for controlling the movement of said transverse frame carried disks.

4. In a power transmitting mechanism, a driving shaft, and a driven shaft, a shiftable friction disk mounted on said driven shaft, a train of normally engaged friction gears for transmitting the motion of said driving shaft to said disk, means including a screw and lever device coöperative with certain of the gears of said train for operatively disconnecting said train of gears from said disk, and other means for shifting said disk to change speed.

5. In a power transmitting mechanism, a driving shaft and a driven shaft, a shiftable friction disk mounted on said driven shaft, a train of normally engaged friction gears for transmitting the motion of said driving shaft to said disk, means including a screw operated device for operatively disconnecting said train of gears from said disk, other means for shifting said disk to change speed, and means coöperative with said last named means for operatively reconnecting said train of gears with said disk when said disconnecting means is released.

6. In a power transmitting mechanism, a driving shaft and a driven shaft, a shiftable friction disk mounted on said driven shaft, a train of friction gears for transmitting the motion of said driving shaft to said disk, means for operatively disconnecting said train of gears from said disk, other means for shifting said disk to change speed, said disk having a clutch face, a member on said driving shaft for coöperating with said clutch face when said clutch face is brought into engagement therewith to lock said driving and driven shafts directly together and a latch device on said driven shaft to engage said shiftable disk and retain it with its clutch face in engagement with said driving shaft member.

7. In a power transmitting mechanism, a driving shaft and a driven shaft, a shiftable friction disk mounted on said driven shaft, a train of friction gears for transmitting the motion of said driving shaft to said disk, means for operatively disconnecting said train of gears from said disk, other means for shifting said disk to change speed, means for operatively reconnecting said train of gears with said disk when said disconnecting means is released, said disk having a clutch face, a member on said driving shaft for coöperating with said clutch face when said clutch face is brought into engagement therewith to lock said driving and driven shafts directly together and a latch device on said driven shaft to engage said shiftable disk and retain it with its clutch face in engagement with said driving shaft member.

8. In a power transmitting mechanism, a driving shaft and a driven shaft, a shiftable friction disk mounted on said driven shaft, a train of friction gears for transmitting the motion of said driving shaft to said disk, means for operatively disconnecting said train of gears from said disk, other means for shifting said disk to change speed, said disk having a clutch face, a member on said driving shaft for coöperating with said clutch face when said clutch face is brought into engagement therewith to lock said driving and driven shafts directly together, and means for locking said disconnecting means in its disconnected position when said driving and driven shafts are directly connected.

9. In a power transmitting mechanism, a driving shaft and a driven shaft, a shiftable friction disk mounted on said driven shaft, a train of friction gears for transmitting the motion of said driving shaft to said disk, means for operatively disconnecting said train of gears from said disk, other means for shifting said disk to change speed, means for operatively reconnecting said train of gears with said disk when said disconnecting means is released, said disk having a clutch face, a member on said driving shaft for coöperating with said clutch face when said clutch face is brought into engagement therewith to lock said driving and driven shafts directly together, and means for locking said disconnecting means in its disconnected position when said driving and driven shafts are directly connected.

10. A driving shaft and a driven shaft, a shiftable friction disk keyed on said driven shaft, a second friction disk mounted separately from said shafts and directly engaging said driven shaft disk, friction gears for transmitting motion of said driving shaft to said second disk, and a screw actuated means for holding said second disk in contact with said shiftable disk and said friction gear connection with said driving shaft.

11. In a power transmitting means, a driving shaft and a driven shaft, a shiftable friction disk on said driven shaft, a second shiftable friction disk mounted separately from said shaft, means continuously tending to move said second disk out of engagement with said shiftable disk, power transmitting connections between said driving shaft and said second disk, means continuously tending to oppose the action of said first mentioned continuously tending means and retain said second disk in engagement with said shiftable disk, and a screw device for assisting each of said continuously acting means in the performance of its respective function, according as said screw device is turned in one direction or the other, and means for shifting said shiftable disk.

12. In a power transmitting means, a driving shaft and a driven shaft, a shiftable friction disk on said driven shaft, a second shiftable friction disk mounted separately from said shaft, means continuously tending to move said second disk out of engagement with said shiftable disk, power transmitting connection between said driving shaft and said second disk, means continuously tending to oppose the action of said first mentioned continuously tending means and retain said second disk in engagement with said shiftable disk, a screw device for assisting each of said continuously actuating means in the performance of its respective function, according as said screw device is turned in one direction or the other, means for shifting said shiftable disk, said shiftable disk having a clutch member and said driving shaft having a clutch member to directly connect said shafts when said clutch members are in engagement, and means coöperative with said screw device for locking said second disk out of engagement with said shiftable disk when said shafts are directly connected.

13. In a power transmitting means, a driving shaft and a driven shaft, friction gear connections between the two shafts and including a shiftable friction disk on the driven shaft, and a second disk to engage said shiftable disk, and means for disconnecting said second disk from said shiftable disk, means for shifting said shiftable disk, said shiftable disk and said driving shaft each having a coöperating clutch member to effect a direct connection between the two shafts when said shiftable disk is in one position, and means on said driven shaft for retaining said shiftable disk in said one position.

14. In a power transmitting means, a driving shaft and a driven shaft, friction gear connections between the two shafts and including a shiftable friction disk on the driven shaft, and a second disk to engage said shiftable disk, means for disconnecting said second disk from said shiftable disk, means for shifting said shiftable disk, said shiftable disk and said driving shaft each having a coöperating clutch member to effect a direct connection between the two shafts when said shiftable disk is in one position, means on said driven shaft for retaining said shiftable disk in said one position, and other means coöperative with said second disk disconnecting means and with said driven shaft disk shifting means for locking said disconnecting means to hold said second disk disconnected when said shafts are directly connected.

CLAYTON E. FREDERICKSON.

Witnesses:
LINCOLN SONNTAG,
WM. H. STENGER.